United States Patent [19]

Holm

[11] Patent Number: 5,305,163

[45] Date of Patent: Apr. 19, 1994

[54] STATIONARY ANGULARLY ALIGNED STATIONARY SPINDLE SHAFT

[75] Inventor: A. W. Holm, Minneapolis, Minn.

[73] Assignee: Seagate Technology, Inc., Scotts Valley, Calif.

[21] Appl. No.: 25,717

[22] Filed: Mar. 2, 1993

Related U.S. Application Data

[63] Continuation of Ser. No. 636,483, Dec. 31, 1990, abandoned.

[51] Int. Cl.⁵ ............................................. G11B 17/02
[52] U.S. Cl. ................................ 360/98.01; 360/97.01; 360/98.07; 360/99.08
[58] Field of Search ............... 360/97.01, 98.07, 98.08, 360/99.08, 98.01, 97.03, 97.04

[56] References Cited

U.S. PATENT DOCUMENTS

| | | | |
|---|---|---|---|
| 3,894,738 | 4/1988 | Elsasser et al. | 360/97.01 |
| 4,814,652 | 3/1989 | Wright | 360/98.07 |
| 4,858,044 | 8/1989 | Crapo | 360/99.08 |
| 4,894,738 | 1/1990 | Elsasser et al. | 360/97.01 |
| 4,905,110 | 2/1990 | Krum et al. | 360/99.08 |
| 4,965,685 | 10/1990 | Young et al. | 360/99.08 X |
| 4,996,613 | 2/1991 | Hishida | 360/99.08 |
| 5,031,061 | 7/1991 | Hatch | 360/98.07 |
| 5,089,922 | 2/1992 | Le Clair | 360/99.08 |
| 5,091,809 | 2/1992 | Connors et al. | 360/99.08 |

Primary Examiner—John H. Wolff

[57] ABSTRACT

A stationary spindle shaft assembly supports and controllably rotates a disc pack within the housing of a magnetic disc drive. The shaft assembly includes an elongate spindle shaft fixed with respect to the drive housing, and a stator surrounding and integral with the spindle shaft. A centered, axial bore in the spindle shaft is open to one end of the spindle shaft to receive a bundle of electrically conductive lines for mechanical and electrical coupling to the stator through a printed circuit. A pair of radial apertures are formed in the shaft near the inward end of the axial bore. Each aperture is open to the bore and to the spindle shaft exterior, and accommodates approximately one-half of the conductive lines as they extend from the bore to the stator. The radial apertures are spaced apart from one another 180 degrees, such that a selected axial plane bisecting the shaft also bisects each of the apertures. The spindle shaft is mounted in a predetermined angular relation to the disc drive housing, to position the selected bisecting plane at least approximately in the direction of maximum expected vibration during operation of the disc drive. In disc drives with linear actuators, this direction is the direction of linear actuator travel. In drives with rotary actuators, the direction is that of a tangent of the arcuate path traveled by the magnetic transducing heads as the actuator pivots, taken near a midpoint of the arcuate path.

29 Claims, 2 Drawing Sheets

STATIONARY ANGULARLY ALIGNED STATIONARY SPINDLE SHAFT

This application is a continuation of U.S. patent application Ser. No. 07/636,483, filed Dec. 31, 1990, now abandoned.

BACKGROUND OF THE INVENTION

This invention relates to devices for reading, writing, and storing bit-encoded data, and more particularly to disc drives including packs of multiple, concentrically stacked discs mounted to rotate on stationary spindle shafts.

The continuing effort to increase data storage capacities of magnetic disc drives and other data storage devices is concerned largely with increasing the density at which data can be stored on the available recording surface area. Another approach concerns increasing available recording surface area by mounting multiple discs integrally, concentrically and axially spaced apart from one another on a single spindle assembly. Such spindle assemblies typically include an elongate shaft, a hub that directly supports the discs, and bearing assemblies at opposite ends of the shaft to support the hub and discs for rotation relative to the disc drive frame or housing. Also mounted movably with respect to the housing is an actuator for supporting a plurality of data transducing heads. The actuator, whether of the rotary or linear type, selectively positions the transducing heads relative to the discs.

The spindle shaft can be mounted rotatably to the housing through the bearing assemblies. Alternatively, the shaft is stationary or fixed within the housing, with the hub and discs mounted on the shaft through the bearing assemblies. This latter approach allows a more secure, fixed mounting of the shaft that reduces vibration. The mass and inertia of the rotating parts is reduced, as such parts no longer include the spindle shaft. Further, the stator can be fixed to a stationary shaft, eliminating the need for a stationary sleeve or similar part to surround the shaft and support the stator.

Moreover, a stationary spindle shaft provides a conduit for electrical conductors coupled to the stator. More particularly, a central bore is formed in the spindle shaft, open to one end of the shaft and extending axially, i.e. lengthwise along the shaft to a location near the stator. A generally radial aperture extends from the axially inward end of the central bore to the shaft exterior. The flexible cable exits the shaft through the aperture for connection to the stator.

These openings in the spindle shaft give rise to certain difficulties. First, the removal of material to form the openings weakens the spindle shaft. The resonant frequency of the shaft is lower than a solid shaft of identical size and shape, increasing the response time in track-seeking and track-following, and increasing spindle vibration amplitudes in response to actuator movement. The radial aperture introduces an asymmetry which further increases the amplitude and complexity of vibrations introduced in the spindle. These factors limit the efficiency of the disc drive, in terms of extending track-seek times and diminishing transducer positioning accuracy.

Some of these difficulties can be counteracted by providing alternative conduits for electrical conductors. U. S. Pat. No. 4,894,738 (Elsasser et al) discloses a disc drive with a stationary spindle shaft in which a centered, axially extended bore and a generally radial and inclined bore cooperate to provide a conduit, but only for conductors to the stator windings. A separate aperture, formed through a flange or sleeve surrounding one end of the spindle shaft, accommodates conductors associated with commutating and position sensing electronics, as illustrated in FIGS. 5 and 6 of the patent. This arrangement is said to avoid excessive weakening of the shaft. While it does provide for a stronger spindle shaft with a higher resonant frequency, it also raises the need for alternative apertures for electrical conductors, and fails to address the problem of spindle shaft asymmetry.

Therefore, it is an object of the present invention to provide, in a disc drive data storage apparatus, a stationary spindle shaft symmetrical about an axial bisecting plane.

Another object of the invention is to provide a stationary spindle shaft for a disc drive, capable of accommodating conductors for position sensing and commutating as well as conductors to the stator windings, without unduly diminishing the strength or resonant frequency of the shaft.

Yet another object is to provide a stationary spindle shaft in a disc drive, formed with a symmetrical arrangement of radially directed conductor carrying apertures, for enhanced strength and resonant frequency in the shaft to improve the response to vibrations introduced by an actuator of the disc drive during track-seeking and track-following operations.

SUMMARY OF THE INVENTION

To achieve these and other objects, there is provided a stationary spindle shaft assembly for supporting a hub assembly and controllably rotating the hub assembly relative to a disc drive frame. The shaft assembly includes an elongate spindle shaft with a longitudinal spindle axis. An internal passage extends longitudinally along at least a portion of the shaft length. A plurality of apertures are provided, each open to the internal passage and open to the spindle exterior. The spindle shaft is integrally mounted with respect to a stationary disc drive frame. A stator surrounds the spindle shaft and is integral with the shaft. A flexible conducting means provides electrical current to the stator for generating a magnetic field proximate the stator to rotate the hub assembly about the spindle axis. The flexible conducting means comprises a plurality of sets of electrically conductive lines. Each line is electrically coupled to the stator. A portion of the flexible conducting means, including all of the lines, is contained within the internal passage. Each of the sets of conducting lines extends through an associated one of the apertures from the internal passage toward the stator.

The invention is most advantageously employed in a disc drive in which the hub assembly is mounted on the spindle shaft for rotation relative to the shaft about the spindle axis. The hub assembly includes a hub and rotor surrounding and radially spaced apart from the stator, and a plurality of data storage discs mounted to the hub to rotate with the hub responsive to an electrical current in the stator Preferably the internal passage is a bore centered on the spindle axis. A first end of the bore is open to one end of the spindle shaft, to receive the flexible conducting means. A second, opposite end of the bore is open to the apertures. The plurality of apertures can consist of two apertures angularly spaced apart from one another 180 degrees. The apertures extend radially away from the longitudinal bore, and further can be inclined axially away from the bore in the radially outward direction. The preferred conducting means is a bundle of wires having a proximal end portion divided into a pair of end segments. Each end segment contains one of the sets of conductive lines or wires, and extends through its associated aperture.

The spindle shaft is symmetrical about a longitudinal or axial bisecting plane that also bisects each of the apertures. In accordance with a feature of the present invention, the spindle shaft is angularly aligned with the disc drive frame or housing, such that the bisecting plane extends substantially in the direction of maximum expected operational vibration. In disc drives with linear actuators, the spindle shaft is aligned with the bisecting plane parallel to the direction of travel of the linear actuator. In drives with rotary actuators, the spindle shaft is aligned to position the bisecting plane parallel to a tangent of the arc traversed by the data transducing heads, taken at or near the midpoint of the arc. In either event, the spindle shaft is positioned to minimize the impact of actuator accelerations and decelerations upon the spindle shaft and hub assembly.

The symmetrical spindle shaft has the further advantages of increased strength and higher resonant frequency, as compared to a substantially identical shaft having a single radial aperture to accommodate conductors for spindle electronics. The asymmetry associated with the single aperture shaft is eliminated, and when a pair of radial apertures accommodate the same number of conductive lines, each aperture can be made smaller in diameter. Accordingly the symmetrical shaft, properly aligned with the disc drive housing, responds more rapidly and more consistently to disturbances, whether due to actuator movement or otherwise. The result is reduced track-seek times and greater accuracy in track-following, for more rapid storage and retrieval of data and the potential for storage of data at increased densities.

IN THE DRAWINGS

For a further understanding of the above and other features and advantages, reference is made to the following detailed description and to the drawings, in which.

DETAILED DESCRIPTION OF THE PREFERRED EMBODIMENTS

Figure 1:
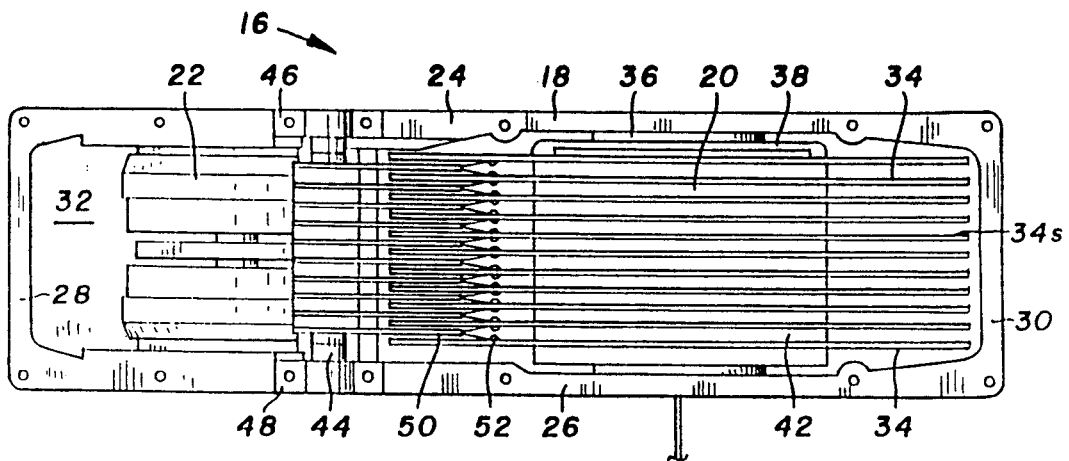
FIG. 1 is an elevation of a magnetic disc drive including a spindle assembly constructed in accordance with the present invention.

Turning now to the drawings, there is shown in FIG. 1 a magnetic disc drive 16 including a deck 18 forming part of the housing or frame of the drive. A cover is removed from the deck in this figure, to reveal a disc pack or hub assembly 20 and a rotary actuator 22, both of which are mounted movably with respect to the deck.

The deck preferably is constructed of aluminum, and has substantially parallel and spaced apart upper and lower support walls 24 and 26 which support the disc pack and the rotary actuator. The deck further has opposite side walls 28 and 30 and a back wall 32, which maintain the spaced apart relation of support walls 24 and 26. Forward edges of the support walls and side walls form a substantially planar forward edge surface, which mates with a conforming edge surface of the cover when the cover and deck are joined to form the housing.

Disc pack 20 includes a plurality of discs 34 mounted in a stack, coaxial and axially spaced apart from one another on a rotatable hub 36. A clamping ring 38 is releasably secured to the top of the hub. The clamping ring, in cooperation with a flange 40 at the bottom of the hub (FIG. 2), clamps discs 34 and a series of annular spacers 42 in an alternating sequence to determine the axial spacing between adjacent discs. Fasteners secure the clamp to the hub, so that the clamp and flange frictionally maintain the discs and spacers integrally for rotation in concert with the hub.

Rotary actuator 22 includes an actuator shaft 44 mounted to pivot relative to deck 18 about a vertical pivot axis. Upper and lower bearing assemblies 46 and 48 rotatably support opposite ends of shaft 44. A plurality of transducer support arms 50 are fixed with respect to the shaft for rotation with the shaft. Each arm carries at least one magnetic data transducing head 52. In a known manner, rotary actuator 22 is pivoted to selectively position transducing heads 52 along arcuate paths disposed radially of discs 34, for selective positioning of the transducers. Actuator pivoting, in combination with controlled rotation of discs 34 about a vertical spindle axis, allows reading and recording of data at any desired location on any one of the recording surfaces.

All of discs 34 except one are devoted to storing working data, i.e. the data of direct interest to users of disc drive 16. The exception, designated as 34s in FIG. 1, includes one recording surface dedicated to servo information, i.e. the data that indicates the angular position of discs 34 with respect to the disc drive housing, and the angular position of rotary actuator 22, based on the position of transducing heads 52 radially of discs 34.

Figure 2:
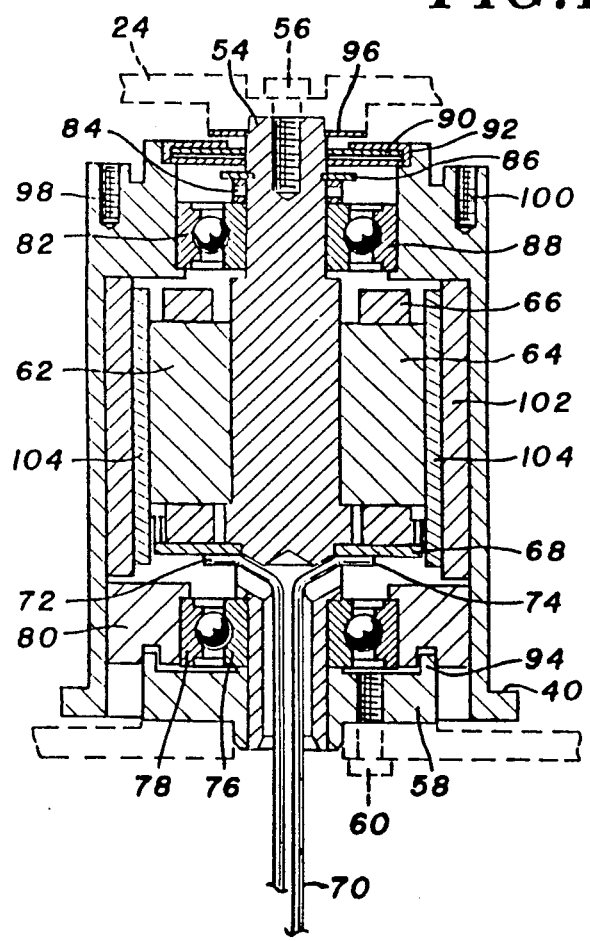
FIG. 2 is a sectioned elevation of the spindle assembly of the drive.

FIG. 2 is a sectional view of part of disc pack 20, together with a stationary spindle shaft assembly for supporting and rotating the disc pack or hub assembly. The spindle shaft assembly includes an upright spindle shaft 54, fixed to upper wall 24 of the deck by a threaded fastener, indicated in broken lines at 56. The bottom end of shaft 54 is press-fit into a sleeve or flange 58. The sleeve is fixed to lower support wall 26 of the deck by a plurality of threaded fasteners, one of which is shown in broken lines at 60. A stator 62, including annular core laminations 64 and wire windings 66, surrounds the spindle shaft, fixed to the shaft and thus stationary. An annular printed circuit board 68 likewise is stationary, and is electrically coupled to the stator.

An electrically conductive bundle of cables 70 is mechanically and electrically coupled to printed circuit 68. More particularly, a pair of end segments of the bundle, shown respectively at 72 and 74, extend radially outward in opposite directions from the spindle axis toward the printed circuit. Bundle 70, shown schematically, actually includes eleven separate conductive lines or wires. Six of the wires supply current to the stator windings. The remaining wires are provided either for position sensing or commutating electronics. Of the conductive lines, approximately one-half (five) form part of end segment 72, with the remaining six lines contained in segment 74.

The hub assembly is mounted rotatably on spindle shaft 54 through upper and lower bearing assemblies. The lower bearing assembly includes an annular inner race 76 fixed to the shaft with an adhesive, and a rotating annular outer race 78. The outer race is fixed to an annular bearing housing 80, with the bearing housing in turn being fixed to hub 36.

The upper bearing assembly includes an annular inner race 82 mounted slidably on the spindle shaft, and biased downwardly as viewed in FIG. 2 by an annular spring 84 between inner race 82 and a snap ring 86 fixed to the shaft. An outer race 88 of the upper bearing assembly is fixed to hub 36.

Just above snap ring 86, at the interface of the hub and spindle, is a ferrofluidic seal 90. The ferrofluidic seal is provided to protect discs 34 against contamination from particulates or other foreign matter generated within the cavity formed by hub 36, e.g. due to friction in the bearing assemblies. A seal shield 92 is mounted to the hub, just above the ferrofluidic seal. An annular flange 94 of sleeve 58 cooperates with an annular channel in bearing housing 80 to provide a labyrinth seal near the bottom of spindle shaft 54, again to protect the discs. A cover shield 96 is fixed to the top of the spindle shaft, just above seal shield 92.

A series of internally threaded openings in hub 36, two of which are shown at 98 and 100, receive threaded fasteners for securing clamping ring 38 to the hub. A rotor, including an annular steel back iron 102 and a plurality of arcuate magnets 104 secured to the back iron, rotates with the hub. While not apparent in FIG. 2, a continuous radially inward surface formed by the magnets is radially spaced apart from the radially outward surface of core laminations 64, to define a narrow annular air gap between the stator and rotor.

In a known manner, current is supplied to stator windings 66 to generate a magnetic field about stator 62. The magnetic field interacts with the magnetic fields of magnets 104 providing a tangential force to rotate disc pack 20 relative to the spindle shaft. Stator core 64, hub 36 and spindle shaft 54 preferably are constructed of aluminum.

Figure 3:
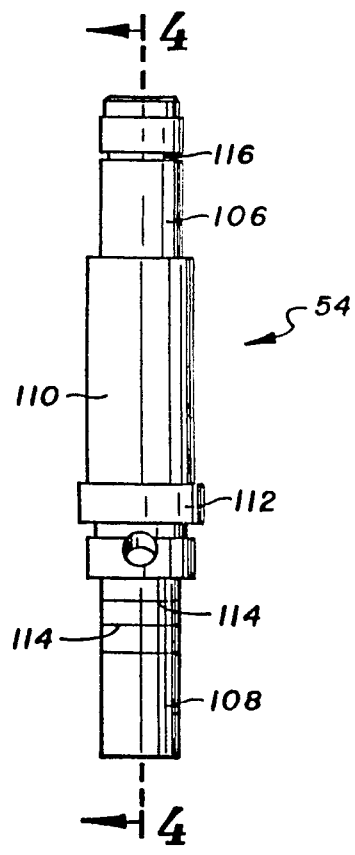
FIG. 3 is an elevation of a spindle shaft of the spindle assembly.

From FIG. 3 it is apparent that spindle shaft 54 is not uniform in diameter, but rather stepped to include upper and lower sections 106 and 108, and an intermediate shank 110. Stator 62 surrounds shank 110 and rests on an enlarged section 112 immediately below the shank. Inner race 82 of the upper bearing assembly surrounds upper section 106, while inner race 76 of the lower bearing assembly surrounds the lower section. Three grooves 114 in the lower section enhance the adhesion of the lower inner race. Snap ring 86 is contained by a groove 116 in the upper section.

Figure 4:
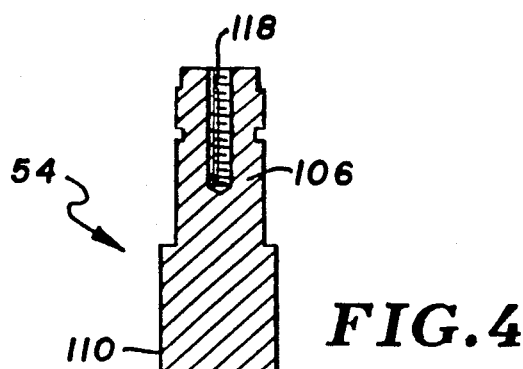
FIG. 4 is a sectional view of the spindle shaft.

As seen in FIG. 4, an internally threaded opening 118 is formed in spindle shaft 54 to accommodate top fastener 56. A bore 120 runs longitudinally or axially along lower section 108, and is open to a bottom edge 122 of the spindle shaft to receive wire bundle 70. Longitudinal bore 120 is beveled to an increased radius at the bottom of the spindle shaft. At the upper end of passage or bore 120 are a pair of apertures 124 and 126, respectively. Each of the apertures is open to the longitudinal bore and to the exterior of the spindle shaft. Further, each aperture is inclined upwardly in the radially outward direction.

Figure 5:
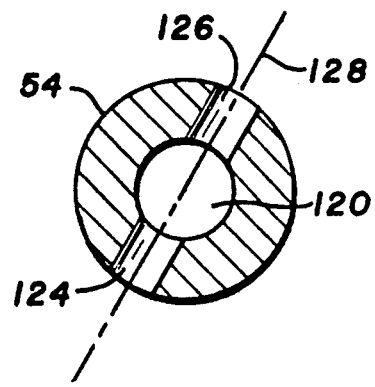
FIG. 5 is a sectional view taken along the line 5—5 in FIG. 4.

As seen in FIG. 5, apertures 124 and 126 are angularly spaced apart from one another 180 degrees, and longitudinal bore 120 is circular in transverse profile and centered on the spindle axis. Apertures 124 and 126 likewise are circular in profiles taken normal to their extension. Thus, spindle shaft 54 is symmetrical about an axially extended plane indicated by the line 128 in FIG. 5, which bisects the shaft and each of the apertures.

Figure 6:
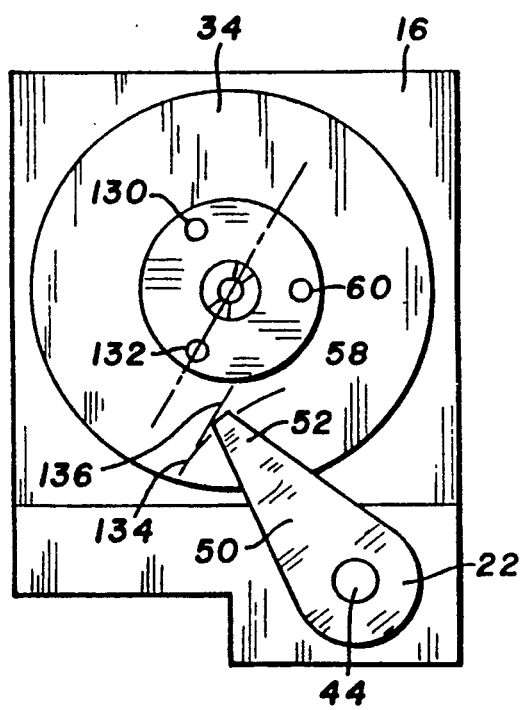
FIG. 6 is a schematic bottom view of the disc drive.

FIG. 6 is a diagrammatic bottom view of disc drive 16, illustrating the position of rotary actuator 22 relative to deck 18 and disc pack 20, and further illustrating the angular position of spindle shaft 54 with respect to the deck. Fastener 60, and two additional fasteners 130 and 132, releasably secure sleeve 58 to the deck, more particularly to lower support wall 26. Spindle shaft 54 is fixed within the sleeve, and thus fixed relative to the deck. Rotary actuator 22 pivots relative to the deck on actuator shaft 44, and thus carries magnetic transducing heads 34 in an arcuate path 134 as it pivots.

A tangent to arcuate path 134, taken near the midpoint of the arcuate path, is shown at 136 in the figure. Spindle shaft 54 is advantageously aligned with the tangent, i.e. such that axial plane 128 is parallel to tangent 136. With shaft 54 so aligned, its maximum strength or resistance to bending is disposed in a direction of maximum expected operational vibration. In other words, forces due to rapid accelerations and decelerations of actuator 22 tend to act upon the spindle shaft in the direction of tangents to arcuate path 134. Of course, a degree of compromise is involved in shaft alignment, since the direction of the tangent changes along the arcuate path. By contrast, in a drive employing a linear actuator, spindle shaft 54 or its equivalent can be aligned such that plane 128 is parallel to the actuator direction of travel, throughout the range of actuator travel. Further, it has been found in practice that positioning shaft 54 to within thirty degrees of the parallel alignment results in satisfactory performance.

Plane 128 also passes through fastener 132. This is not accidental, but intended to facilitate assembly of disc drive 16 with the spindle shaft properly aligned. More particularly, prior to assembly the bottom end of shaft 54 is marked to indicate the angular position of apertures 124 and 126. For example, a straight line can be etched into the bottom edge, such that the line is contained within plane 128. Then, when lower section 108 of the shaft is press-fit within and adhered to sleeve 58, the mark is aligned with one of three equally angularly spaced apart internally threaded openings that later accommodate fasteners 60, 130 and 132.

Figure 7:
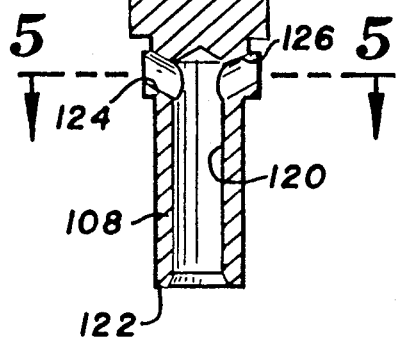
FIG. 7 is a sectional view similar to that in FIG. 5, illustrating a spindle shaft according to another embodiment of the invention.

FIG. 7 is a sectional view of an alternative embodiment spindle shaft 140 having a central longitudinal bore 142 substantially similar to bore 120 of spindle shaft 54. Three substantially identical radial apertures are formed at 144, 146, and 148, each with a circular profile and upwardly inclined in the radially outward direction. Apertures 144, 146 and 148 are equally angularly spaced apart from one another 120 degrees, and thus ar symmetrical about the spindle axis.

For both spindle shafts 54 and 140, a plurality of radial apertures is provided in lieu of a single radial aperture, so that the size of each radial aperture can be reduced. In each case, the strength and rigidity of the spindle shaft is enhanced. For example, the central bore and single radial aperture in previous spindle shafts has the same diameter, i.e. 0.196 inch. In spindle shaft 54, longitudinal bore 120 has the same diameter, but the diameter of each radial aperture (124, 126) is substantially smaller, i.e. 0.125 inch. The presently preferred embodiment, however, uses shaft 54 with dual radial apertures. The cost of machining shaft 54 is less than for shaft 140, and the arrangement of opposite apertures permits the preferred alignment for maximum shaft strength illustrated in FIG. 6. Further, however, it can be appreciated that the capacity of each aperture to accommodate a bundle segment is based upon its cross-sectional area, meaning that an aperture reduced to half of the original diameter has approximately one-fourth the original capacity. This relationship between aperture diameter and aperture capacity favors a low number of apertures.

Figure 8:
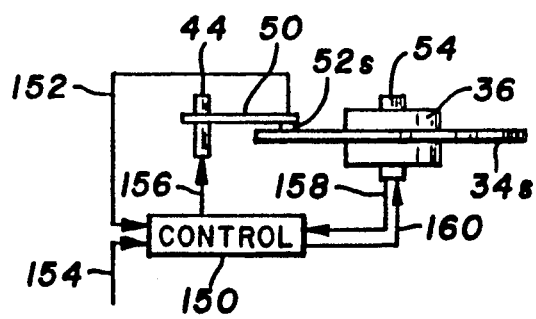
FIG. 8 is a schematic view illustrating the operation of the disc drive.

FIG. 8 diagrammatically illustrates the operation of disc drive 16. Shaft 54 supports hub 36 and all discs for rotation, although only servo disc 34s is illustrated. Likewise, actuator shaft 44 pivotally supports all of the arms and transducing heads, with only one arm 50 and a servo transducer 52s being shown. A plurality of electrically conductive lines interconnect the actuator and spindle assembly with a control circuit 150. More particularly, a line 152 provides the control circuit with information on the position of transducing heads 52 radially of the discs. A command line 154 supplies information on the desired position of the transducing heads, which is compared to the actual position information. Based on this comparison, a signal can be provided to actuator 22 over a line 156 to pivotally adjust the actuator.

A line 158, representing three of the individual conductive lines in conductive bundle 70, provides disc angular position information to the control circuit. The control circuit in turn governs the electrical current provided to stator 62 over a line 160, which represents a plurality of conductive wires in the bundle. More particularly, bundle 70 includes six such lines, two for each of three phases of the motor comprising stator 6 and the rotor.

Thus, in accordance with the present invention, a stationary spindle shaft is provided with an axially extended central bore for accommodating a bundle of electrically conductive lines, in combination with a plurality of radial apertures, each accommodating a set or subgroup of conductive lines, for supplying current to a stator integral with the shaft, position sensing, and the commutating function. The plural radial apertures have reduced diameters, for a stronger, more rigid spindle shaft. Further, when two radial apertures are angularly spaced apart from one another by 180 degrees, the spindle shaft can be aligned angularly with the disc drive housing such that the direction of maximum resistance to bending in the spindle is at least approximately aligned with the direction of maximum expected vibration during operation of the disc drive.

What is claimed is:

1. An apparatus for supporting data storage discs with respect to a disc drive housing for rotating the discs in concert relative to the housing, including:

an elongate spindle shaft with a longitudinal spindle axis, an internal passage extended longitudinally along at least a portion of the shaft length, an entry to the internal passage from the spindle exterior, and an exit from the internal passage including two apertures extended radially outward from the internal passage and angularly spaced apart 180 degrees, each aperture being open to the internal passage and open to the spindle exterior;

a fastening means for mounting the spindle shaft integrally with respect to a disc drive housing in a predetermined angular alignment with the disc drive housing to orient an axial plane bisecting the apertures to within 30 degrees of parallelism with a direction of maximum expected operational vibration;

a stator surrounding the spindle shaft and integral with the shaft;

a hub assembly mounted on the spindle shaft for rotation relative to the spindle shaft about a spindle axis, said hub assembly including a hub and a rotor surrounding and radially spaced apart from the stator, and a plurality of data storage discs mounted to the hub for rotation with the hub responsive to an electrical current in the stator;

a conducting means for providing electrical current to the stator for rotating the hub assembly, said conducting means comprising a plurality of sets of electrically conductive lines, each of the electrically conductive lines being electrically coupled to the stator, wherein all of the sets of lines extend into the internal passage through the entry and are contained within the internal passage, and wherein said sets of lines further extend out of the internal passage through the exit toward the stator, each of the sets of lines being contained within a different one of the apertures.

2. The apparatus of claim 1 wherein:

the internal passage comprises a bore centered on the spindle axis, a first end of the bore is open to one end of the spindle shaft to provide the entry for receiving the conducting means, and a second and opposite end of the bore is open to the apertures.

3. The apparatus of claim 2 further including an annular printed circuit integral with and electrically coupled to the stator, each of the conductive lines be connected to the printed circuit.

4. The apparatus of claim 1 wherein:

each of the apertures is inclined axially away from the second end of the bore in the radially outward direction.

5. The apparatus of claim 1 wherein:

the conducting means is flexible and comprises a bundle of wires, with each said set of electrically conductive lines consisting of a set of the wires, said bundle of wires including a proximal end portion divided into a plurality of end segments, each end segment including one of the sets of wires and extending through its associated one of the apertures.

6. The apparatus of claim 5 wherein:

the bundle of wires has two end segments, each of the end segments including at least approximately the same number of the wires.

7. The apparatus of claim 6 further including:

an annular printed circuit integral with and electrically coupled to the stator, the wires of said bundle of wires being connected to the printed circuit.

8. The apparatus of claim 6 wherein:

the fastening means includes an annular sleeve integrally secured to said one end of the spindle shaft, and three fasteners equally angularly spaced apart from one another about the spindle axis for releasable fixing the sleeve to the housing, and wherein an axial plane bisecting the spindle shaft and each of the apertures passes through one of the three fasteners.

9. The apparatus of claim 1 wherein:
the axial plane is parallel with the direction of maximum expected operational vibration.

10. The apparatus of claim 1 further including:
a rotary actuator supporting the plurality of data transducing heads and mounted to pivot about a longitudinal pivot axis relative to the disc drive housing to carry the transducing heads in an arcuate path relative to the data storage discs, and wherein said direction of maximum expected operational vibration is parallel to a tangent of the arcuate path taken near a midpoint of the path.

11. A stationary spindle shaft assembly for supporting and controllably rotating a disc relative to a disc drive frame, said spindle shaft assembly including:
an elongate spindle shaft with a longitudinal spindle axis, an internal passage extended longitudinally along at least a portion of the shaft length, an entry into the internal passage from the spindle exterior, and an exit from the internal passage including two apertures extended radially outward form the internal passage and spaced apart angularly 180 degrees, each aperture being open to the internal passage and open to the spindle exterior;
a fastening means for mounting the spindle shaft integrally with respect to a disc drive frame in a predetermined angular alignment with the frame whereby an axial plane bisecting the shaft and each of the apertures is oriented to within 30 degrees of being parallel with a direction of maximum expected operational vibration;
a stator surrounding the spindle shaft and integral with the shaft, and
a conducting means for providing electrical current to the stator for generating a magnetic field proximate the stator to rotate a hub assembly about the spindle axis, said conducting means comprising a plurality of sets of electrically conductive lines, each said electrically conductive line being electrically coupled to the stator, wherein all of the sets of lines extend into the internal passage through the entry and are contained within the internal passage, and wherein the sets of conductive lines further extend out of the internal passage toward the stator via the exit, each of the sets of lines being contained within a different one of the apertures.

12. The spindle shaft assembly of claim 11 wherein:
the conducting means comprises a flexible bundle of conductive wires, with each said set of electrically conductive lines consisting of a set of the wires, said bundle of wires having a proximal end portion separated into a plurality of end segments, each end segment including one of the sets of conductive wires and extending through its associated one of the apertures.

13. The spindle shaft assembly of claim 12 wherein:
the bundle of conductive wires has two of said end segments, each of the end segments including at least approximately the same number of the conductive wires.

14. The spindle shaft assembly of claim 13 further including:

an annular printed circuit integral with and electrically coupled to the stator, the conductive wires of the bundle being connected to the printed circuit.

15. The spindle shaft assembly of claim 13 wherein:
said fastening means includes a sleeve integrally secured to and surrounding one end of the spindle shaft, and three fasteners equally angularly spaced apart from one anther about the spindle shaft axis for releasably fixing the sleeve to the frame, the shaft being angularly aligned with the sleeve whereby an axial plane bisecting the shaft and each of the two apertures passes through one of the fasteners.

16. The spindle shaft assembly of claim 13 wherein:
the axial plane is parallel with the direction of maximum expected vibration.

17. The spindle shaft assembly of claim 13 further including:
a rotary actuator supporting at least one data transducing head and mounted to pivot about a longitudinal pivot axis relative to the frame to carry the transducing head in an arcuate path, and wherein the direction of maximum expected operational vibration is parallel to a tangent of the arcuate path taken near a midpoint of the path.

18. The spindle shaft assembly of claim 11 wherein:
the internal passage is a bore centered on the spindle axis, with a first end of the bore open to one end of the spindle shaft to provide the entry for receiving the conducting means, and wherein a second and opposite end of the bore is open to the apertures.

19. The spindle shaft assembly of claim 18 wherein:
the apertures extend radially outward from the internal passage, and are inclined axially away from the second end of the bore in the radially outward direction.

20. A stationary spindle shaft assembly for supporting and controllably rotating a disc relative to a disc drive frame, said spindle shaft assembly including:
an elongated spindle shaft with a longitudinal spindle axis, a passage extended longitudinally along at least a portion of the spindle shaft length, and entry to the passage from the spindle exterior, and an exit from the passage open to the spindle exterior;
a fastening means for mounting the spindle shaft integrally with respect to a disc drive frame in a predetermined angular alignment with the frame whereby an axial plane bisecting the spindle shaft, the passage and the exit is oriented to within 30 degrees of being parallel with a direction of maximum expected operational vibration;
a stator surrounding the spindle shaft and integral with the spindle shaft;
a plurality of electrically conductive liens extended into and along the passage via the entry, and extended out of the passage toward the stator via the exit, said electrically conductive lines providing an electrical current to the stator for generating a magnetic field proximate the stator to rotate a hub assembly about the spindle access.

21. The spindle shaft assembly of claim 20 wherein:
each of the electrically conducive liens comprises a flexible wire.

22. The spindle shaft assembly of claim 20 wherein:
said fastening means includes a sleeve integrally secured to and surrounding one end of the spindle shaft, and a plurally of fasteners angularly spaced apart from one another about the spindle shaft axis for releasably fixing the sleeve to the frame, the shaft being angularly aligned within and with respect to the sleeve whereby said axial plane bisecting the shaft, the passage and the exit, also passes through one of said fasteners.

23. The spindle shaft assembly of claim 22 wherein: said one end of the spindle shaft is marked to indicate the angular position of the exit.

24. The spindle shaft assembly of claim 22 wherein: said axial plane is parallel with the direction of maximum expected vibration.

25. The spindle shaft assembly of claim 20 further including:
a rotary actuator supporting at least one data transducing head and mounted to pivot about a longitudinal pivot axis relative to the frame to carry the transducing head in an arcuate path, and wherein the direction of maximum expected operational vibration is parallel to a tangent of the arcuate path taken near a mid-point of the path.

26. The spindle shaft assembly of claim 20 wherein: the passage is formed internally of the spindle shaft, and the exit comprises at least one aperture open to the passage and open to the spindle exterior.

27. The spindle shaft assembly of claim 20 wherein: said passage is a bore centered on the spindle axis, with a first end of the bore open to one end of the spindle shaft to provide the entry for receiving the electrically conductive lines, and wherein said exit is at a second and opposite end of the bore.

28. The spindle shaft of claim 27 wherein: said exit extends radially outward from the bore, and is inclined axially away from the second end of the bore in the radially outward direction.

29. The spindle shaft assembly of claim 20 further including:
a hub assembly mounted on the spindle shaft for rotation relative tot he spindle shaft and the disc drive frame about a spindle axis, the hubassembly including a hub and a rotor surrounding and radially spaced a part from the stator, and a plurality of data storage discs mounted to the hub for rotation with the hub responsive to an electrical current in the stator.

* * * * *